United States Patent [19]

Inagaki et al.

[11] Patent Number: 5,741,825
[45] Date of Patent: Apr. 21, 1998

[54] THERMAL INSULATING FOAMED MATERIAL AND METHOD FOR MANFACTURING THE SAME

[75] Inventors: Fumihiro Inagaki; Takashi Hashida; Masa-aki Suzuki, all of Osaka; Yoshio Kishimoto, Hirakata; Takayoshi Ueno, Katano, all of Japan

[73] Assignee: Matsushita Electric Industrial Co., Ltd., Osaka-Fu, Japan

[21] Appl. No.: 524,194

[22] Filed: Sep. 6, 1995

[30] Foreign Application Priority Data

Sep. 7, 1994 [JP] Japan .................................. 6-213940
Oct. 21, 1994 [JP] Japan .................................. 6-256746

[51] Int. Cl.$^6$ ...................................................... C08J 9/14
[52] U.S. Cl. ...................... 521/88; 521/90; 521/94; 521/114; 521/128; 521/129; 521/131
[58] Field of Search .......................... 521/131, 94, 88, 521/114, 90, 128, 129

[56] References Cited

U.S. PATENT DOCUMENTS

| | | |
|---|---|---|
| 5,169,873 | 12/1992 | Behme et al. . |
| 5,205,956 | 4/1993 | Volkert et al. . |
| 5,278,195 | 1/1994 | Volkert et al. . |
| 5,539,008 | 7/1996 | Dams et al. .................. 521/131 |
| 5,631,306 | 5/1997 | Dams et al. .................. 521/131 |

FOREIGN PATENT DOCUMENTS

| | | |
|---|---|---|
| 0 520 860 A1 | 12/1992 | European Pat. Off. . |
| 0 523 398 A1 | 1/1993 | European Pat. Off. . |
| 0 579 321 A1 | 1/1994 | European Pat. Off. . |
| 4-7317 | 1/1992 | Japan . |
| 5-247249 | 9/1993 | Japan . |
| A 05 247 249 | 9/1993 | Japan . |
| 5-295155 | 11/1993 | Japan . |
| 6-306139 | 11/1994 | Japan . |
| WO 94/20588 | 9/1994 | WIPO . |

*Primary Examiner*—Morton Foelak
*Attorney, Agent, or Firm*—Panitch Schwarze Jacobs & Nadel, P.C.

[57] ABSTRACT

A polyurethane foam is constituted by using a blowing agent selected from the group consisting of iodofluorohydrocarbons, perfluoroalkenes and hydrogen-containing fluoromorpholine derivatives. These blowing agents have a low thermal conductivity and a short life in the air, and thus impose no or very small load such as ozone layer depletion potential (ODP) and global warming potential (GWP) on the environment. The iodofluorohydrocarbon, in particular, can give an incombustibility and self-extinguishing property to the conventionally used inflammable substance such as cyclopentane or the like, and thus is also advantageous from the viewpoint of safety of the thermal insulating material.

14 Claims, 1 Drawing Sheet

THERMAL INSULATING FOAMED MATERIAL AND METHOD FOR MANFACTURING THE SAME

BACKGROUND OF THE INVENTION

1. Field of the Invention

The present invention relates to a thermal insulating foamed material which can be applied to a refrigerator, freezer and the like, or a thermal insulating material for architectural use and the like, and a method for manufacturing the same by using a novel blowing agent.

2. Description of the Prior Art

Recently, environmental pollution such as ozone layer depletion by chlorofluorocarbons (CFC substances) has become a social problem. It was decided in 1995 that the use of the particular CFC substances, such as trichloromonofluoromethane or the like, which are an important blowing agent used in the manufacturing of the thermal insulating foamed material such as hard polyurethane foam, should be completely discontinued.

In order to cope with this problem, the use of a material having a small ozone depletion potential (ODP), for instance, 1,1-dichloro-2-fluoroethane (HCFC-141b), 1,1-dichloro-2,2,2-trifluoroethane (HCFC-123) or the like, has since been proposed as the blowing agent and already been put into practical use for manufacturing the refrigerator and the like. The HCFC-141b and HCFC-123, however, have at least one chlorine atom in their molecular structures and their ozone depletion potential is not zero. They therefore only serve as a transitional substitute for the purpose, and are required to be replaced with a material that can be used for a long period of time.

As a blowing agent which can be used for a long time, a hydrocarbon, such as cyclopentane or the like, is disclosed as a compound which has a superiority in chemical and physical properties as well as a property gentle to the environment, because it contains no halogen and therefore does not destroy the ozone layer. (For instance, Gerhardt Heilig and Yoshinori Kihara: Hard Urethane Foam Blown with Pentane, in Proceedings of the International Forum on Polyurethane, held in May, 1993, p.197). The disclosure further contends that inflammability of the hydrocarbon can be solved if a safety measure is suitably taken in the production technology and the amounts of incombustible and/or fire retardant agents are increased in the foam.

The proposed polyurethane foam produced by using pentane however suffers a disadvantage of poor safety against fire and explosion in addition to its poorer thermal insulating property as compared with the prior art polyurethane foam produced by using HCFC-141b, HCFC-123 and the like.

On the other hand, as a similar substitute for the CFC substance blowing agent, fluorocarbons containing no chlorine are attracting attention in this field of art, and there is disclosed a foam produced by using, as its blowing agent, a perfluorohexane which is a perfluorinated hydrocarbon, in European Patent Application EPA 351,614 (Japanese Laid-Open Patent Publication No. Hei 2-86,635), for instance.

In a thermal insulating material prepared with a foamed material having small closed cells of which convection of a gas confined in closed cells can be disregarded, the thermal conductivity of the material is represented by a sum of a heat conduction by the gas confined in the closed cells, a heat conduction by heat radiation inside the closed cells, and a solid heat conduction of the resin itself.

Therefore, in the use of the above-mentioned perfluorinated compound such as perfluorocarbons as the blowing agent, it is important to make the cell diameter as small as possible, thereby to reduce the radiation, and to lower the density of the resin itself, thereby to reduce the contribution of the solid heat conduction of the resin.

In general, the cell diameter is reduced by introducing a blowing core agent. (For instance, Japanese Laid-Open Patent Publication No. Hei 3-54,231). As the blowing core agent, perfluoroalkanes such as perfluoropentane are being utilized. A technical advantage of a reduction in the cell diameter can be obtained by emulsifying a polyol composition with an emulsifier of perfluoroalkane, and by combining the obtained emulsion with a blowing core agent such as silica gel, starch and the like.

It is also proposed to produce a polyurethane foam having a low thermal conductivity by reducing the cell diameter, using an emulsion containing a perfluorocarbon by 5.5% or less as the blowing core agent together with the blowing agent of HCFC-123 or HCFC-141b. (For instance, Japanese Laid-Open Patent Publication No. Hei 5-186,629).

In view of the environmental pollution by the CFC substances such as ozone layer depletion or global warming, the use of perfluoroalkanes such as perfluoropentane is also ready to be restricted because the perfluoroalkanes have a longer life span in the air than the particular CFC substances, which is estimated 500 years or longer.

It is also proposed to produce the thermal insulating resin foamed material by the use of fluorinated alkene, including a process of the use of perfluoro-2-pentene and a hydrocarbon in combination (for instance, Japanese Laid-Open Patent Publication No. Hei 5-247,249), and another process of the use of a perfluoroalkylethylene and water in combination (for instance, Japanese Laid-Open Patent Publication No. Hei 5-279,653).

On the other hand, in the method for molding the resin foamed material in an integrated form, water is added to stabilize the physical property of the foam. The characteristic feature obtained in the case of blowing with the addition of water is that a heat is generated by the reaction of polyisocyanate with water and carbon dioxide is produced, whereby the blowing performance of the composition is enhanced. The resin component containing urea bond formed by the reaction of isocyanate with water is stronger than that of the urethane bond and can give an incombustible property. This method has been very effective in the case of using water as a substitute for the prior art CFC substances. However, it has a disadvantage that if a blowing agent having a low thermal conductivity is used, the performance of the blowing agent cannot be effectively utilized because carbon dioxide is contained in the resin foamed material and is contributing to the increase in the gas thermal conductivity inside the closed cells. Therefore, an advent of technology is eagerly desired wherein the thermal insulating property of resin foamed material can be improved by utilizing the process of adding water, and by absorbing the formed carbon dioxide after molding of the foamed material.

As the technology, a method is proposed to improve the thermal insulating property of the foamed material by adding sodium hydroxide or soda-lime as a carbon dioxide reactive reagent, thereby to absorb the produced carbon dioxide (for instance, Japanese Laid-Open Patent Publication No. Hei 6-322,166).

SUMMARY OF THE INVENTION

The primary object of the present invention is to provide a thermal insulating resin foamed material, which is excellent in the thermal insulating property and in the safety such as nonflammability and non-explosive property, utilizing a novel blowing agent which has a low thermal conductivity and is substantially free from any environment destroying performance such as ODP, global warming potential (GWP) and the like.

It is another object of the present invention to provide a method for manufacturing the thermal insulating resin foamed material which employs the novel blowing agent.

The present invention is characterized by the use of the novel blowing agent of at least one compound selected from the group consisting of iodofluorohydrocarbons, perfluoroalkenes and hydrogen-containing fluoromorpholine derivatives.

The present invention provides a thermal insulating foamed material comprising a foamed resin composition having a multiplicity of closed cells, which confine a gas of the above-mentioned blowing agent.

The present invention also provides a method for producing the thermal insulating foamed material comprising the step of concurrent blowing and molding of a resin raw material composition including a blowing agent composed of at least one compound selected from the group consisting of iodofluorohydrocarbons, perfluoroalkenes, hydrogen-containing fluoromorpholine derivatives, a polyol, a polyisocyanate, a catalyst for urethane reaction, and a foam stabilizer.

In the above-mentioned configuration, the blowing agent is preferably a mixture of the iodofluorohydrocarbon with either one of the perfluoroalkene and the hydrogen-containing fluoromorpholine derivative.

Another preferable blowing agent of the present invention is the above-mentioned blowing agent further mixed with a hydrocarbon, in particular a hydrocarbon having a boiling point of 50° C. or lower.

In a preferred embodiment of the present invention, water is used as the blowing agent in addition to the above-mentioned blowing agent.

While novel features of the invention are set forth in the preceding, the invention, both as to its organization and content, can be further understood and appreciated, along with other objects and features thereof, from the following detailed description and examples when taken in conjunction with the attached drawings.

DESCRIPTION OF THE PREFERRED EMBODIMENTS

Figure 1:
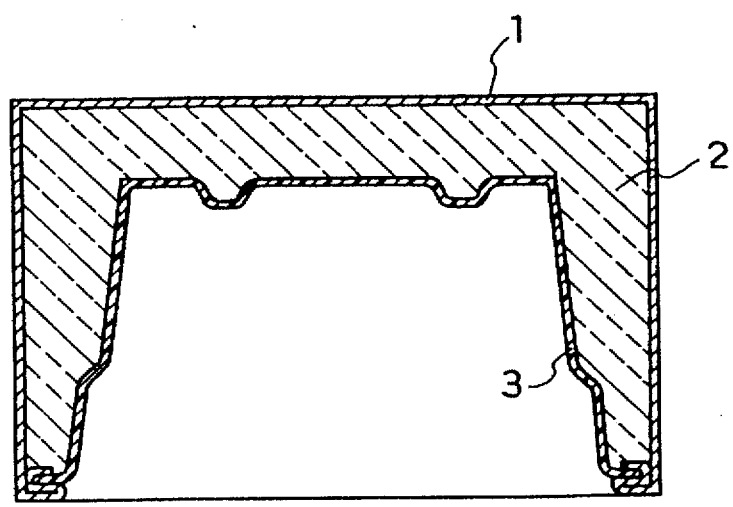
FIG. 1 is a cross-sectional view schematically showing an example of a thermal insulating housing filled with a hard polyurethane foam in accordance with the present invention.

For constituting the thermal insulating resin foamed material in accordance with the present invention, polystyrene and phenolic resin may be used. However, in view of the control of the cell diameter and easiness in on-the-spot blowing/molding, polyurethane is particularly preferred. The following description will therefore be made on the resin foamed material produced by using urethane reaction, As the blowing agent for the present invention, a combined use of an iodofluorohydrocarbon with the other blowing agent is particularly preferred.

In the use of the iodofluorohydrocarbon, it is preferable to add at least one member selected from the group consisting of carbonate compounds, esters and ethers having a boiling point of 100° C. or higher to the resin raw material composition.

An addition of a reducing agent or an oxygen absorbing agent to the resin raw material composition is also effective.

It is preferable that the reducing agent is dispersed in a polyisocyanate composition together with a surfactant to produce a polyisocyanate emulsion, which is then mixed with the polyol mixture (premixture) for constituting the resin raw material composition.

A preferable reducing agent is an aqueous solution of sodium thiosulfate.

In the use of the iodofluorohydrocarbon as the blowing agent, the polyol preferably comprises at least 30 wt % of a non-amine polyol.

In a preferred embodiment of the present invention, the resin raw material composition is prepared by mixing a polyisocyanate composition containing the iodofluorohydrocarbon, with a premixture containing the polyol, the catalyst for urethane reaction, and the foam stabilizer.

In another preferred embodiment of the present invention, the resin raw material composition further comprises a salt saluble in a primary alcohol or a secondary alcohol having 3 or less carbon atoms as the cell core agent.

In another preferred embodiment of the present invention, the method for producing the thermal insulating foamed material comprises the step of concurrent blowing and molding of a resin raw material composition including a complex compound of an iodofluorohydrocarbon with an amine, an ammonium salt or a quaternary ammonium salt having a non-conjugated bond, a polyol, and a polyisocyanate, wherein the iodofluorohydrocarbon is liberated from the complex compound by the heat generated by the reaction of the polyol with the polyisocyanate, and the liberated iodofluorohydrocarbon acts as the blowing agent.

In the above-mentioned embodiment, it is preferable that the above-mentioned resin raw material composition further contains as a catalyst for urethane reaction at least one member selected from the group consisting of an organotin compound, a metal salt of an organic acid, an aromatic amine and an organophosphorus compound.

In the above-mentioned embodiment, it is also preferable that the above-mentioned resin raw material composition further contains water, in a range up to an equimolar amount of the above-mentioned complex compound and at 10 parts by weight or less for 100 parts by weight of the above-mentioned polyol component.

In a preferred embodiment of the method for producing the thermal insulating material containing water as the blowing agent, the above-mentioned resin raw material composition further contains an epoxide and a carbon dioxide fixation catalyst, and the method further comprises the step of reducing the pressure inside the closed cells of the produced foamed material by allowing the carbon dioxide produced during the blowing step to react with the above-mentioned epoxide to form a carbonate compound.

In the above-mentioned embodiment, it is preferable that the above-mentioned resin raw material composition is prepared by mixing a polyisocyanate composition containing the iodofluorohydrocarbon and the carbon dioxide fixation catalyst, with a premixture containing the polyol, the catalyst for the urethane reaction, and the foam stabilizer.

In the above-mentioned embodiment, it is preferable that the above-mentioned resin raw material composition further contains a complex compound of the carbon dioxide fixation catalyst with the iodofluorohydrocarbon, and the method comprises the step of decomposing the above-mentioned complex compound to form the iodofluorohydrocarbon and the carbon dioxide fixation catalyst, thereby allowing the formed carbon dioxide fixation catalyst to participate in the reaction of the epoxide with the carbon dioxide produced during the blowing step.

The hydrocarbon to be used as the blowing agent together with the iodofluorohydrocarbon is preferably at least one member selected from the group consisting of pentane, isopentane and cyclopentane. A preferable mixing ratio of this hydrocarbon is 45–96 mol %.

As the foam stabilizer, it is preferable to use a dimethylsiloxane-oxyalkylene copolymer in combination with a dimethylsiloxane-oxyalkylene copolymer having a fluoroalkyl group in its molecule.

Of the materials to be added to the resin raw material, the reducing agent and the carbon dioxide fixation catalyst are preferably incorporated in the isocyanate composition. It is preferable that the other materials are incorporated in the polyol composition.

The novel blowing agent, which is employed in the present invention, has a relatively short life span in the air and thus has no or, if any, a very small global warming potential.

The iodofluorohydrocarbons have a very short life time in the air as compared with the prior art CFC substances because iodine is liable to be separated from the molecules. Further, the life of perfluoroalkenes is also predicted to be shorter in the air, because reaction of OH-radical with double bond in the molecule proceeds easily in the air. Moreover, the life of hydrogen-containing fluoromorpholine derivatives is also predicted to be short in the air, because the site of the hydrogen atom in the molecule is close to the site of the oxygen and nitrogen atoms and the bonding energy of carbon—hydrogen bond is weaker than that of perfluoromorpholine and perfluoromethylmorpholine, and the molecule is more liable to be decomposed.

Further, all of these substances have a low vapor thermal conductivity, and resin foamed materials produced by employing them have a small load on the environment and can serve as an excellent thermal insulating material because of their thermal insulating property. In addition, these blowing agents are nonflammable and thus are advantageous substances from the viewpoint of the safety.

Among these substances, the iodofluorohydrocarbons in particular have the lowest thermal conductivity and the shortest life time in the air. In addition, as the iodofluorohydrocarbons have an iodine atom and thus have a negative catalytic action against combustion, they can give an incombustible property or a hardly inflammable property and a self-extinguishing property to the resin foamed composition. Moreover, if inflammable ethers, hydrocarbons or the like, are employed in combination with the iodofluorohydrocarbons as the blowing agent, it is possible to make the blowing agent itself nonflammable.

Since the iodofluorohydrocarbons are not only nonflammable themselves but also function as a fire extinguisher to liberate iodine at the time of firing, they act as the blowing agent having both the nonflammability and the self-extinguishing property if mixed with perfluoroalkenes or hydrogen-containing fluoromorpholine derivatives, not to mention their single use.

At present, as one of the blowing agent having no load on the environment, a blowing agent of hydrocarbons is attracting attention in this field of art. The hydrocarbons such as pentane, isopentane, cyclopentane and the like are useful as the blowing agent having a high thermal insulating property. The hydrocarbons are however inflammable in general and therefore are dangerous.

When one member of the iodofluorohydrocarbons, perfluoroalkenes and hydrogen-containing fluoromorpholine derivatives is mixed with the above-mentioned hydrocarbon blowing agent in accordance with the present invention, the produced resin foamed material becomes incombustible or hardly inflammable. Therefore, the resin foamed material is also useful as the thermal insulating material for architectural use in addition to the use in refrigerators. The firing property or explosive property of the mixed blowing agent can be excluded by mixing at least one member selected from the iodofluorohydrocarbons, perfluoroalkenes and hydrogen-containing fluorinated morpholine derivatives to the hydrocarbon blowing agent at a mixing ratio in a range of 4 mol %–55 mol %.

Since the iodofluorohydrocarbons, in particular, have a self-extinguishing property in addition to its incombustibility or hardly inflammable property, they can give the mixed blowing agent not only the incombustibility or hardly inflammable property but also the self-extinguishing property when they are added to the hydrocarbon blowing agent in the above-mentioned range. Among them, a compound having a boiling point of 0° C. or lower, such as trifluoroiodomethane, can be used as a coolant (cooling medium) having no load on the environment. Moreover, there is no problem of firing because this compound has a self-extinguishing property.

That is, when a hydrocarbon is used as the coolant, mixed with the trifluoroiodomethane, it can be made nonflammable without deteriorating the technical advantage as the coolant. The primary object of the present invention is to provide a configuration that makes the best use of this iodofluorohydrocarbon.

The iodofluorohydrocarbons are very liable to be dissolved in the polyol which is the raw material for the resin. If they are used alone as the blowing agent, reaction of the polyol premixture, i.e., the polyol composition containing the blowing agent, with polyisocyanate is much retarded, in comparison with the prior art CFC substance blowing agent. For this reason, the cell diameter of the produced polyurethane foam is likely to become larger.

By contrast, the perfluoroalkenes and the hydrogen-containing fluoromorpholine derivatives are hard to dissolve in polyol and thus produce an emulsion. Since the perfluoroalkenes and the hydrogen-containing fluoromorpholine derivatives dispersed in the polyol serve as the cell core during the blowing process, the cell diameter of the produced polyurethane foam can be made small. The viscosity of the polyol premixture however becomes high and an intermiscibility of the raw materials is lowered by the formation of the emulsion. For this reason, there is a tendency that the density of the produced resin foamed material increases and occurrence of cell puncture increases.

Surprisingly, the present inventors have found that combined use of the iodofluorohydrocarbons with perfluoroalkenes or hydrogen-containing fluoromorpholine derivatives as the blowing agent creates a hybrid effect, and that the combined use produces a polyurethane foam having a thermal insulating property superior to that of the foams produced by a single use of each of the compounds as the blowing agent. These findings can be elucidated as follows.

That is, when these two blowing agents are used together, the polyol composition forms an emulsion if mixed with a perfluoroalkene or a hydrogen-containing fluoromorpholine derivative, but the viscosity of the emulsion is lowered by the addition of an iodofluorohydrocarbon, which is excellent in the intermiscibility with the polyol, thereby causing homogeneous mixing in a short period of time to improve the blowing performance. Because of this phenomenon, it is possible to obtain a polyurethane foam having a relatively small cell diameter, a low resin density and free from the cell puncture.

Further, it is also very effective to add water to the above-mentioned blowing agents and to use carbon dioxide formed by the reaction of water with polyisocyanate as the blowing agent. In the combined use of the above-mentioned blowing agents in accordance with the present invention with water, a high heat is produced by, for instance, a reaction of water with polyisocyanate during the concurrent mixing and blowing. As a result, a sufficient amount of heat is yielded that is required for vaporizing the iodofluorohydrocarbon, which is excellent in the intermiscibility with the polyol, and for blowing the composition. As a result, the blowing performance improves.

Moreover, the blowing using water is effective to reduce the size of the closed cells. This improves the feature of the iodofluorohydrocarbon that the size of the formed closed cells is likely to become large. It further yields the following technical advantages. That is, a gas of a blowing agent having a good intermiscibility with the resin raw material such as polyol is liable to permeate through the resin foamed material with a lapse of time or aging. However, since the resin composition produced by the blowing with water has a high bridged bond density, the permeation of the gas of the blowing agent is hard to occur. And, it shows a stable thermal insulating property after a lapse of time. Further, the blowing with water is effective for improving the blowing performance of the perfluoroalkenes and hydrogen-containing fluoromorpholine derivatives.

It is also effective for improving the blowing performance to add an organic carbonate compound, an ester or an epoxide having a boiling point of 100° C. or higher to the resin raw material. Although iodofluorohydrocarbons are fluorine compounds, they have a property liable to be intermixed with the resin raw material such as polyol or the like in general.

Due to this high intermiscibility, there is a tendency that the closed cell size is enlarged during the blowing process, thereby to worsen the thermal insulating property of the produced foamed material. Coexistence of a polar nonactive hydrogen-containing compound such as carbonate, ester, epoxide or the like can stabilize the blowing performance and the cell diameter by its dilution effect. Further, when the above-mentioned compounds have a poor intermiscibility with the polyol, they can stabilize the blowing performance and the cell diameter by lowering the viscosity of the premixture emulsion. It is therefore preferable to use these compounds when a perfluoroalkene or a hydrogen-containing fluoromorpholine derivative is used as the blowing agent.

The novel blowing agent in accordance with the present invention has an advantage that its load on the environment is zero or very small if any, because of its short life time in the air, but there still remains an inconvenience of possible decomposition of the blowing agent inside the closed cells in the thermal insulating resin foamed material, or another inconvenience of possible deterioration in the performance of the produced resin because of its short life time. It is therefore preferable to take a measure for preventing such inconveniences. One of such measures is an addition of a reducing agent to the resin. The reducing agent reduces an oxidizing substance such as iodine which is produced by the decomposition of the iodofluorohydrocarbon, and maintains the thermal insulating property of the foamed material stable for a long time.

An addition of an oxygen absorbing agent is also effective for the stabilization of the iodofluorohydrocarbon confined in the closed cells in the thermal insulating resin foamed material. The oxygen absorbing agent decreases the amount of the dissolved oxygen inside the closed cells and suppresses possible oxidation of the iodofluorohydrocarbon. The oxygen absorbing agent can also produce a stable dispersion when it is mixed with polyisocyanate having a property as an electron acceptor, similar to the oxygen absorbing agent.

In the use of the iodofluorohydrocarbon as the blowing agent, it is preferable to use a polyol composition containing a non-amine polyol. An amine and an iodofluorohydrocarbon easily form a complex compound and fail to blow, thereby to worsen the blowing performance of the composition. In order to avoid such an inconvenience, it is required to reduce the amine component in the resin raw material. A polyol composition containing at least 30 wt % of the non-amine polyol does not easily form the complex compound with the iodofluorohydrocarbon, and thus obviates the inconvenience due to the formation of the complex compound.

In a preferred embodiment of the present invention, a thermal insulating resin foamed material is manufactured by mixing a resin raw material to contain a complex compound of an iodofluorohydrocarbon with an amine, an ammonium salt or a quaternary ammonium salt having a non-conjugated bond, and by blowing the mixture. The iodofluorohydrocarbon easily forms the complex compound with the above-mentioned amine or ammonium salt and is stabilized. The present inventors have found that the complex compound is very effective for the manufacturing process of the thermal insulating resin foamed material and for the improvement in its performance.

A preferable complex compound to be used here is as follows. That is, it has a certain binding force, which varies widely by the compound to be combined, and is in a solid or a liquid state at room temperature. It does not easily vaporize at a boiling point of the employed iodofluorohydrocarbon, and therefore does not separate by standing. The above-mentioned complex compound however separates by heating to liberate the iodofluorohydrocarbon, depending on the intensity of the binding force. Further, when water is added to the complex compound, it is separated into a top layer and a bottom layer; the top layer is a water phase which dissolves the amine and the bottom layer is a liquid phase comprising the iodofluorohydrocarbon. When the iodofluorohydrocarbon is exposed to light, it immediately releases iodine and is colored red, but its complex compound with the amine is very stable against the light and becomes completely free from the decomposition by light.

These complex compounds concurrently act as the blowing agent and as the catalyst for the urethane reaction. The behavior of these complex compounds will be described in the examples.

According to the present invention, it is preferable to add the complex compound as a composition in a solid state or a high boiling point liquid state which does not change in weight for a week or longer at room temperature. With this procedure, it is possible to prevent a possible photochemical decomposition of the iodofluorohydrocarbon and to reduce a possible loss in the iodofluorohydrocarbon during the blowing process. Since the complex compound becomes a solid state or a high boiling point liquid state depending on the intensity of the binding force, it is possible to increase the storing stability of the raw material before the blowing process, and to decrease the loss of the blowing agent and the deterioration of the premixture during the blowing operation.

The resin foamed material in accordance with one embodiment of the present invention contains, in its closed cells, a blowing agent selected from the group consisting of the iodofluorohydrocarbons, the perfluoroalkenes and the hydrogen-containing fluoromorpholine derivatives, and carbon dioxide.

In a more preferred embodiment, the resin foamed material contains a carbonate component produced by fixing the carbon dioxide with the epoxide mixed at the stage of raw material in the presence of a carbon dioxide fixation catalyst. As the carbon dioxide fixation catalyst, it is preferable to use a catalyst containing a nucleophilic reagent and/or an electrophilic reagent.

In this configuration, the carbon dioxide having a high thermal conductivity does not contribute to the vapor thermal conductivity of the resin foamed material because the carbon dioxide generated during the blowing process is fixed by absorption. Therefore, the thermal conductivity performance of the above-mentioned blowing agent becomes preferable. According to the present invention, it is possible to obtain a resin foamed material having a low thermal conductivity, because of the low vapor thermal conductivity of the blowing agent.

When water is added to the raw material, the carbon dioxide is released by the reaction represented by the formula 1 or by a combination between the molecules of the polyisocyanates represented by the formula 2 below.

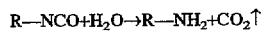

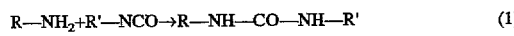  (1)

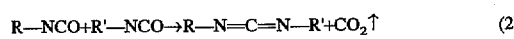  (2)

Although these reactions have been indispensable to improve the blowing performance, to reduce the size of the closed cells and to increase the mechanical strength of the produced foam, the problem remains unsolved that the thermal conductivity of the gas confined in the closed cell is increased by the release of the carbon dioxide.

A carbonate compound is formed by reaction of the carbon dioxide with an epoxide compound represented by the formula 3 below. The carbonate compound, which has an effect of improving the blowing performance and another effect as a plasticizer, is a preferable substance for improving the thermal insulating performance of the foamed material. Further, the epoxide is also preferable because it polymerizes itself during the blowing process and contributes to the enhancement of the mechanical strength of the foamed material as one of its resin components.

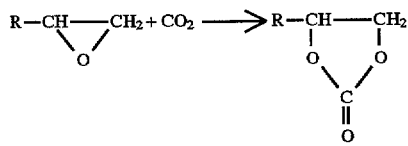  (3)

In the reaction of the carbon dioxide with the epoxide, it is also preferable to employ a catalyst containing a nucleophilic reagent and/or an electrophilic reagent as the carbon dioxide fixation catalyst for increasing the yield of the reaction represented by the formula 3.

However, there has been a possibility that the above-mentioned epoxide may effect a ring-opening addition polymerization with the polyisocyanate and/or the polyol of the resin raw material components. Depending on the composition of the resin raw material, the epoxide may disappear from the reaction system before fixing the carbon dioxide. Further, since this carbon dioxide fixation catalyst has a function of polymerizing the polyisocyanate, it has been impossible to mix it with the polyisocyanate.

However, since the iodofluorohydrocarbon and the above-mentioned carbon dioxide fixation catalyst stabilize themselves by their interaction, they can be added to the polyisocyanate composition, and isolated from the epoxide. This enables a reduction of the amount of the epoxide to be employed for the polymerization and production of a thermal insulating resin foamed material having a good performance without hindering the reaction of the resin.

Further, there is another method for solving the above-mentioned problem to configure the composition by mixing the complex compound of the amine or ammonium salt, or quaternary ammonium salt having the non-conjugated bond and the iodofluorohydrocarbon, with the resin raw material together with the epoxide and the carbon dioxide fixation catalyst. By this configuration, it is possible to accelerate the carbon dioxide fixation reaction to improve the fixation rate, thereby to reduce the vapor thermal conductivity. And thus, a resin foamed material having a high thermal insulating performance can be formed.

More specifically, the above-mentioned complex compound is decomposed by heat to liberate the iodofluorohydrocarbon, which serves not only as the blowing agent but also as the carbon dioxide fixation catalyst after being subjected to the decomposition process by heat or the like. The complex compound itself however does not have a catalytic action for fixing the carbon dioxide.

Because of this configuration, the urethane reaction proceeds in a dimension completely different from the carbon dioxide fixation reaction. And, since the carbon dioxide fixation reaction starts only after the formation of the resin foamed material has almost been completed, it is possible to produce a resin foamed material having a certain mechanical strength which does not deform even in a pressure-reduced state of the closed cells. Further, if a complex compound of the tertiary amine which have no halogen ion with the iodofluorohydrocarbon is used, this complex compound may act as the carbon dioxide fixation catalyst.

In the following paragraphs, a more detailed description will be made on the thermal insulating resin foamed material in accordance with the present invention and on the method for manufacturing the same.

The novel blowing agent to be employed in the present invention is selected from the group consisting of iodofluorohydrocarbons, perfluoroalkenes and hydrogen-containing fluoromorpholine derivatives. This blowing agent demonstrates a sufficient performance in the conventionally used resin raw materials and manufacturing methods.

The iodofluorohydrocarbon as the blowing agent is preferably a compound having 4 or less carbon atoms and a boiling point of 65° C. or lower. These iodofluorohydrocarbons can be exemplified as iodotrifluoromethane ($CF_3I$, boiling point: $-22.5°$ C.), iodopentafluoroethane ($CF_3CF_2I$: 12°–13° C.), 1-iodoheptafluoropropane ($CF_3CF_2CF_2I$: 39° C.), 2-iodoheptafluoropropane ($CF_3CFICF_3$: 39° C.), iodo-1,1,2,2-tetrafluoroethane ($CHF_2CF_2I$: 41° C.), 2-iodo-1,1,1- trifluoroethane ($CF_3CH_2I$: 55° C.), iodotrifluoroethylene ($C_2F_3I$: 30° C.), 1-iodo-1,1,2,3,3,3-hexafluoropropane ($CF_3CHFCF_2I$), 2-iodononafluoro-t-butane (($CF_3$)$_3$CI: 61° C.), and the like.

The perfluoroalkene useful as the blowing agent is a dimer of hexafluoropropene, for instance, perfluoro-4-methyl-2-pentene, perfluoro-2-methyl-2-pentene, and a mixed composition of these. The mixed composition comprises a perfluorocarbon having a boiling point of 48°–51° C., a molecular weight of 300.04 and a carbon-to-carbon unsaturated bond in the molecule. In addition to the dimer of hexafluoropropene, it is preferable to use a compound selected from the group consisting of perfluoro-2-pentene, (perfluorobutyl)ethylene, (perfluoropropyl)ethylene, and octafluorocyclopentene because they have a boiling point suitable for the blowing agent.

As the hydrogen-containing fluoromorpholine derivative useful as the blowing agent may be exemplified as either of monohydroperfluoromorpholine or monohydroperfluoromethylmorpholine, or a mixture thereof. As the monohydroperfluoromorpholine, there are 3H-octafluoromorpholine (molecular weight: 231) and 2H-octafluoromorpholine (molecular weight: 231), and their boiling point is estimated to be 30°–40° C. based on the fact that the boiling point of perfluoromorpholine is 34.5° C.

As the monohydroperfluoromethylmorpholine, there are octafluoro-4-difluoromethylmorpholine (molecular weight: 281, boiling point: 66°–67° C.), 3H-heptafluoro-4-trifluoromethylmorpholine (molecular weight: 281, boiling point: 63.5°–64.5° C.), and 2H-heptafluoro-4-trifluoromethylmorpholine (molecular weight: 281, boiling point: 70° C. or lower), and their boiling point is 70° C. or lower and their blowing performance is favorable as the blowing agent for the polyurethane foam.

Further, it is possible to mix the respective blowing agents. The configuration of a mixture of iodofluorohydrocarbon with either perfluoroalkene or hydrogen-containing fluoromorpholine derivative in particular can make the shape of the closed cells smaller by the hybrid effect and give the resin foamed material the self-extinguishing property.

The previously described blowing agent in accordance with the present invention can improve the physical properties, such as mechanical strength, thermal insulating and the like property, of the resin foamed material, if employed in a mixture with ketones, ethers, esters or hydrocarbons which will be described below. These compounds such as ketones contribute to the improvement in the physical properties of the foamed material by modifying the intermiscibility of the blowing agent with the resin raw material, optimizing the viscosity of the resin raw material, and forming an azeotrope with the above-mentioned blowing agent which lowers its boiling point.

As the ketones which can be applied to the present invention, there are acetone (molecular weight: 58.08, boiling point: 56° C.) and 2-butanone (molecular weight: 72.1, boiling point: 80° C.).

As the ethers which can be applied to the present invention, there are furan (molecular weight: 68.1, boiling point: 32° C.), 2-methylfuran (molecular weight: 82.1, boiling point: 63°–66° C.), tetrahydrofuran (molecular weight: 72.1, boiling point: 66° C.), 2-methyltetrahydrofuran (molecular weight: 86.1, boiling point: 78°–80° C.), 1,3-dioxolan (molecular weight: 74.1, boiling point: 74°–75° C.), 2,5-dihydrofuran (molecular weight: 70.1, boiling point: 66°–67° C.), and the like.

As the esters which can be applied to the present invention, there are methyl acetate (molecular weight: 74.1, boiling point: 57.5° C.), ethyl acetate (molecular weight: 88.1, boiling point: 76.5°–77.5° C.), methyl formate (molecular weight: 60.1, boiling point: 34° C.), ethyl formate (molecular weight: 74.1, boiling point: 52°–54° C.), and the like.

As the hydrocarbons which can be applied to the present invention, there are cyclopentane (molecular weight: 70.2, boiling point: 49.3° C.), isopentane (molecular weight: 72.2, boiling point: 28° C.), normalpentane (molecular weight: 72.2, boiling point: 36.1° C.), 3-methylpentane (molecular weight: 86.2, boiling point: 64° C.), cyclohexane (molecular weight: 84.2, boiling point: 80.7° C.), neohexane (molecular weight: 86.2, boiling point: 49° C.), isohexane (molecular weight: 86.2, boiling point: 63.3° C.), normalhexane (molecular weight: 86.2, boiling point: 69.7° C.), and the like.

Among these, although cyclopentane, isopentane and normalpentane, in particular, have a low thermal conductivity, and independently and sufficiently act as the blowing agent, they can improve the thermal insulating performance of the foamed material if further mixed with the above-mentioned blowing agent in accordance with the present invention. In addition, these hydrocarbons are inflammable themselves and explosive and thus it is dangerous to handle them. However, if they are used in combination with the blowing agent in accordance with the present invention, their inflammability is lowered and they become self-extinguishable and less inflammable.

It is also preferable to add water to the blowing agent. When water is added to the blowing agent, it is possible to improve the blowing performance of the above-mentioned blowing agent in accordance with the present invention, thereby to form a resin foamed material having minute closed cells and a small density.

The above-mentioned mixed blowing agent has a varying effect depending on the raw material composition having ingredients such as polyol, catalyst, foam stabilizer and the like, and thus it is required to adequately select the species and the amount of the blowing agent to be added.

As the reducing agent to be added to the blowing agent in accordance with the present invention, there are metal salts of silicic acid, phosphorous acid, boric acid, carbonic acid, thio-acids, for instance, thiosulfuric acid and the like. Among these, sodium thiosulfate in particular is a preferred reducing agent. Since these reducing agents also act as cell cores, it is preferable to add these to the raw material as minute particles in a micron order by pulverization.

It is further preferable that these reducing agents are first dissolved in the raw material, precipitated during the blowing reaction, and then contained in the resin foamed material in their fine powder state. These fine powders are preferably added together with a surface-active agent (surfactant) and do not to aggregate each other, which prevents the loss of their reducing ability in the raw material. As the surfactant, a silicone foam stabilizer, which is added to the resin raw material, is most preferable, and any of common anionic, cationic and nonionic surfactants may be used.

It is preferable to disperse the above-mentioned reducing agent in the polyisocyanate together with the surfactant. The reducing agent prevents a possible detrimental influence of an oxidizing substance produced by the decomposition of the blowing agent on the resin. The reducing agent also serves as the cell cores because it is mixed with the raw material as the fine powder or it precipitates during the blowing process. The surfactant is required in order to obtain a stable dispersed state of the above-mentioned powder.

In a preferred manufacturing method in accordance with the present invention with the above-mentioned reducing agent, an emulsion is prepared by dispersing water which dissolves sodium thiosulfate, or water or an alcohol which dissolves an organic salt, in the polyisocyanate together with the surfactant. And, a polyurethane foam is manufactured by mixing this emulsion with a polyol composition containing the blowing agent and by blowing the mixed composition.

During the blowing process, the particles of water or alcohol in the above-mentioned emulsion act as the cell cores and are allowed to react with the polyisocyanate when the emulsion starts to disintegrate by a heat generated by the mixing of the polyol with the polyisocyanate. For this, the sodium thiosulfate or organic salt which has been dissolved in the water or alcohol precipitates, and the precipitated substances act as the cell cores. As a result, the closed cells in the obtained foamed material become smaller.

Among the constituents of the blowing agent in accordance with the present invention, the iodofluorohydrocarbon is liable to be decomposed, and actually is partly decomposed during the resin foaming reaction to liberate iodine, which may invite fear of possible deterioration of the resin and possible corrosion of a metal in contact with the resin due to the liberated iodine. The liberated iodine is however allowed to react with the sodium thiosulfate which has been dispersed in the resin homogeneously, and is reduced and actually made harmless.

In case of blowing the resin by using the iodofluorohydrocarbon, the reaction of the polyol with the polyisocyanate is retarded and thus the cell diameter in the obtained resin foamed material becomes larger in comparison with the case of employing another blowing agent. It is therefore preferable, in case of employing the iodofluorohydrocarbon as one ingredient of the blowing agent, to use a polyol composition containing the above-mentioned alcohol and a salt which dissolves in the alcohol in particular. With this polyol composition, the salt serves as the cell cores and the resin foaming reaction is accelerated by the reaction of the alcohol with the polyisocyanate, thereby to make the cell diameter of the polyurethane foam smaller. This behavior becomes prominent in comparison with the case of employing usual blowing agent.

In the manufacturing method in accordance with the present invention, it is also possible to include a salt which dissolves in a primary or secondary alcohol having three or less carbon atoms. The salt acts as the cell cores.

The primary or secondary alcohols having three or less carbon atoms to be added to the polyol composition may be exemplified as methanol, ethanol, isopropanol, allyl alcohol and the like as the monohydric alcohol, and ethylene glycol, 1,3-propane diol and the like as the dihydric alcohol, and glycerine as the trihydric alcohol.

As the above-mentioned salts, any of organic salts and inorganic salts may preferably be used as far as they can be dissolved in the above-mentioned alcohols by about 5–10 wt % or more. For methanol, the suitable salts are exemplified as calcium iodide, sodium iodide, lithium chloride, lithium iodide, potassium iodide, strontium bromide, barium bromide, calcium bromide, sodium bromide, calcium nitrate, magnesium nitrate, copper chloride, magnesium iodide, nickel bromide, potassium benzoate, lithium benzoate, zinc benzoate, ammonium benzoate, ammonium oleate, lithium acetate, potassium acetate, potassium propionate, potassium lactate, sodium lactate, and the like. For ethanol, the suitable salts are exemplified as potassium chloride, potassium iodide, sodium iodide, sodium thiocyanate, strontium bromide, sodium bromide, barium iodide, calcium bromide, calcium nitrate, copper chloride, ferric chloride, lithium bromide, magnesium iodide, ammonium bromide and the like. For propanol, the suitable salts are exemplified as lithium iodide, sodium iodide, calcium bromide, copper chloride and the like, and for isopropanol, copper chloride and the like are exemplified.

As the alcohols, it is preferable to use a polyhydric alcohol which also has an effect of improving the cross-linking density of the resin in general, and among polyhydric alcohols, ethylene glycol is particularly preferred. As the salts to be dissolved therein, it is preferable to use potassium carbonate, barium chloride, potassium iodide, lithium chloride, sodium bromide and calcium chloride in view of their particularly high solubility. In order to obtain an effect of miniaturizing the closed cells as the cell core agent and another effect of improving the cross-linking density of the resin, it is required to add the above-mentioned polyhydric alcohol to the polyol composition exceeding a certain degree. The amount of addition is preferably 0.5 part by weight or more for 100 parts by weight of the polyol. In accordance with this configuration, it is possible to obtain a foamed material having a high mechanical strength and fine closed cells.

In the case of employing the blowing agent of the present invention, it is preferable to add the following carbonate compound, ester or epoxide to the composition, for the purposes of lowering the viscosity of the raw material and of improving the intermiscibility of the blowing agent with the raw material. These additives are preferably not vaporized easily and are compounds having a boiling point of 100° C. or higher. It is also preferable to add these additives in a proportion of 30 wt % or less of the resin raw material for lowering the thermal conductivity of the resin.

As the carbonate compounds, it is preferable to employ dimethyl carbonate, propylene carbonate, 1,2-butylene carbonate, hexylene carbonate, styrene carbonate, vinylethylene carbonate, phenylethylene carbonate, and the like. A carbonate compound produced by addition reaction of an epoxide with carbon dioxide is also preferable.

As the suitable esters, there are a phthalate ester, a phosphoric acid ester, an adipic acid ester, an azelaic acid ester, a sebacic acid ester, an acrylic acid ester, a methacrylic acid ester and the like. As the representative epoxides, there are epoxybutyl stearate, epoxyoctyl stearate, glycidyl benzoate ester and the like.

When these compounds have an activated hydrogen, a favorable effect is obtained because they react with isocyanate to produce a resin.

A foam product, which is added with Cu, $Cu_2O$, Fe, magnetite, cobalt, nickel, zinc, or $Na_2S_2O_3$ as an oxygen absorbing agent for reducing possible oxidation and/or decomposition of the blowing agent, is preferable for maintaining the high thermal insulating property for a long time. Among these, Cu, $Na_2S_2O_3$ and the like also have an effect of reducing the liberated iodine and maintaining the foam stable.

In the case of using the blowing agent comprising the iodofluorohydrocarbons, it is also preferable to use a polyol of non-amines as the polyol for further improving the blowing performance of the polyol composition. The prior art polyols used as the urethane raw material for the thermal insulating material are used as a composition containing an amine as the polymerization initiator and ethanol amine as the reaction stabilizer in general. It is however required to avoid the use of such polyols of amines because they have an interaction with the iodofluorohydrocarbons.

It is therefore preferable to use polyols of non-amines to improve the thermal insulating property of the resin foamed material. As the suitable polyols, there are a polyhydric alcohol, a polyether polyol produced by adding an alkylene oxide by utilizing a saccharide as the reaction initiator, a polyester polyol produced by a polyhydric alcohol-polyhydric carboxylic acid condensation or a cyclic ester-ring-opening polymerization. In addition, a compound having two or more phenolic hydroxyl groups may be used. A composition containing polyhydric alcohols as they are may also be used.

A method for manufacturing a resin foamed material has a feature that the iodofluorohydrocarbon in the polyisocyanate is dispersed stably if it employs a composition, wherein the polyisocyanate is mixed with the iodofluorohydrocarbon. In this method, the above-mentioned blowing agent is added to the polyisocyanate, not to the polyol, by emulsifying the mixture in the course of manufacturing the thermal insulating resin foamed material. This method is preferable because it allows miniaturization of the closed cells.

The iodofluorohydrocarbon can easily form a complex compound with a base such as a non-conjugated amine or an ammonium salt or a quaternary ammonium salt, or the like. The condition of the complex compound varies according to the combination of the compounds. For instance, heptafluoro-2-iodopropane has a very strong interaction with N,N,N',N'-tetramethylhexamethylene diamine, and if the heptafluoro-2-iodopropane is mixed with N,N,N',N'-tetramethylhexamethylene diamine at a molar ratio of 1:1, a brown solid is produced. When this solid is isolated and dissolved in water, the mixture separates into two layers. It is confirmed that a top layer comprises the above-mentioned tetramethylhexamethylene diamine, and a bottom layer comprises heptafluoro-2-iodopropane with a small amount of the tetramethylhexamethylene diamine. Based on this fact, it is considered that the complex compound is formed. This complex compound is not decomposed by an exposure to light.

When an imidazole compound, which is one of aromatic amines, is mixed with the heptafluoro-2-iodopropane in a similar manner, no solid complex compound is formed at any mixing ratio. However, if the mixture is heated, heptafluoro-2-iodopropane, which boils normally at 40° C., does not boil at 70° C. or higher but does boil at 80° C. or higher. When water is added to the mixture, the mixture separates into two layers and boils around the boiling point of heptafluoro-2-iodopropane. It is confirmed that a top layer of the separated layers is a mixture of water and the amine, and a bottom layer comprises mainly heptafluoro-2-iodopropane. From this, it is considered that the complex compound is formed by a weak interaction.

When heptafluoro-1-iodopropane, which is an isomer of the heptafluoro-2-iodopropane, is mixed with N,N,N',N'-tetramethylhexamethylene diamine, no solid complex compound is obtained but a liquid which does not boil at 80° C. or higher is obtained. Based on the fact that the mixture separates into two layer by the addition of water, it is considered that a complex compound is formed even if its binding force is weak.

As described previously, the complex compound of the iodofluorohydrocarbon with the amine is in a liquid state or a solid state depending on the employed compounds, and can form a thermal insulating resin foamed material having a variety of functions by utilizing a difference in its binding force as well.

As a general tendency, it is said that the lower the employed amine is, the stronger the binding force is, and that the higher the polarity of the iodine in the employed iodofluorohydrocarbon is, the stronger the binding force is.

The complex compound suitable for application to the present invention can easily be decomposed by the reaction heat of the resin, and the iodofluorohydrocarbon produced by the decomposition acts as the blowing agent. Such preferable complex compound is selected from a complex compound of the iodofluorohydrocarbon with one member of a non-conjugated tertiary amine, an ammonium salt and a quaternary ammonium salt.

In case of using the complex compound together with a catalyst for the urethane reaction, the above-mentioned complex compound acts as a thermosensitive catalyst for the urethane reaction. Usually, a tertiary amine is employed as the catalyst for the urethane reaction. Such complex compound of the tertiary amine with the iodofluorohydrocarbon is most preferable for the present invention. This complex compound itself has a very low catalytic activity for the urethane reaction, but when the complex compound is decomposed by the reaction heat of the resin and is separated into the amine and the iodofluorohydrocarbon, the separated amine acts as the catalyst for the urethane reaction.

In the reaction, it is preferable that the iodofluorohydrocarbon once vaporizes to act as the blowing agent, and forms a complex compound again with the amine after the completion of the resin reaction, to exist in the foamed resin composition. Hithertofore, if the amine, a catalyst for the urethane reaction, remains in the resin, the remaining amine causes deterioration of the resin and lowering of its thermal insulating property.

As described previously, because the iodofluorohydrocarbon forms again the complex compound with the amine, such inconvenience can be obviated. Although a primary and secondary amines are not employed as the catalyst for the urethane reaction in general, a complex compound of one of such amines with the iodofluorohydrocarbon is preferable because it serves as a weak catalyst for the urethane reaction, and further reacts with polyisocyanate to produce a resin.

Since this complex compound decomposes by the addition of water, the complex compound can control the reaction by the use of water. In case that this complex compound serves as the thermosensitive catalyst for the urethane reaction, it is possible to control the blowing reaction by utilizing a phenomenon that this compound is decomposed by an addition of water, as a result of which its activity to the urethane reaction increases. Since the water serves as a blowing agent at the same time, it is most preferable to add water at 10 parts by weight or less to 100 parts by weight of the polyol.

Substances to be used as the primary amine may preferably be exemplified as alkylamines of ethylamine, butylamine, propylamine, hexylamine and the like, amino alcohols of ethanol amine and the like, a compound whose aromatic ring contains a primary amine represented by aminobenzene, aminobenzimidazole and the like, and an amino group containing organic acid such as anthranilic acid and the like. As the secondary amine, there may preferably be exemplified as an alkyl group addition product of the above-mentioned primary amine, a cyclic amine, sulfamic acid, an amino acid and the like. As the suitable tertiary amine, an alkyl group addition product of the above-mentioned secondary amine and the like are exemplified. In particular, as a compound which demonstrates a catalystic activity for the urethane reaction, a tertiary amine in general use is also suited. The amine catalyst for the urethane reaction in general use may preferably be exemplified as N,N,N',N'-tetramethylhexamethylene diamine, N,N,N',N', N'-pentamethyldiethylene triamine, trimethylaminoethylpiperazine, N,N',N"-tris(3-dimethylaminopropyl)hexahydro-s-triazine, N-trioxyethylene-N,N-dimethylamine, triethylene diamine, N,N-dimethylhexylamine, N,N-dimethylbenzylamine, N-methylmorpholine, and the like.

As the ammonium salt and the quaternary ammonium salt, it is desirable to use an organic acid salt, a phenolic salt and a halogen salt of an amine in general. Among these, tetrabutylammonium bromide, tetrabutylammonium iodide, a phenolic salt of 1,8-diazabicyclo-(5,4,0)undecene-7, and the like are preferable because they can be used, in addition to the catalyst for the urethane reaction, as a carbon dioxide fixation catalyst for the fixation reaction of the epoxide with the carbon dioxide.

The catalyst for the urethane reaction which can be added to the above-mentioned complex compounds, there may preferably be exemplified as an organotin compound, a metal salt of an organic acid, an aromatic amine, an organophosphorus compound, and the like. These compounds are hard to interact with halogen or its compound such as iodofluorohydrocarbon, and are free from the lowering of the activity of the catalyst for the urethane reaction.

As the organotin compounds, it is preferable to use tin dibutyldilaurate, tin dibutyldiacetate, tin dioctyldilaurate, tin dioctyldiacetate, dioctyl tin oxide, tin dioctyldialkylmercaptan and the like.

As the metal salts of an organic acid, it is preferable to use zinc stearate, potassium acetate, potassium octylate, an alkali metal salt of formic acid and the like. These catalysts are effective for forming an isocyanurate structure in the resin and preferable for giving an incombustibility or a hardly inflammable property to the resin.

The aromatic amines are preferable because, though they are an amine, they show a very weak interaction with the iodofluorohydrocarbon and do not lower the activity of the catalyst for the urethane reaction. The aromatic amines of general use serve as a weak catalyst for the urethane reaction. In particular, compounds having a skeletal structure of pyrrole, imidazole, pyrimidine, triazine or benzimidazole are preferred.

The organophosphorus compounds are preferably such a compound that has a skeletal structure of phosphorene oxide and is suitable for increasing the mechanical strength of the resin foamed material by its carbodiimide bond. Further, tetraphenyl phosphonate, triphenylmethyl phosphonate, tetrabutyl phosphonate and the like are preferable because they serve not only as the catalyst for the urethane reaction but also as the carbon dioxide fixation catalyst.

In the following paragraphs, epoxide are shown that are preferable for the use in producing a carbonate compound in the resultant resin foamed material by fixing the carbon dioxide by allowing it to react with the epoxide.

As the epoxides which are added to the resin raw material composition for fixation of the carbon dioxide, there are propylene oxide, butylene oxide and the like which have a low boiling point and serve as the blowing agent. The following epoxides are mono-functional and liquid or solid at room temperature. These epoxides are preferable because they not only fix the carbon dioxide but also serve as an additive for the resin composition. More specifically, a compound having an epoxide ring at its alkyl chain such as octylene oxide, hexylene oxide, or the like, a glycidyl ether compound such as methyl glycidyl ether, butyl glycidyl ether, phenyl glycidyl ether, methacrylic acid glycidyl ester or the like, and epichlorohydrin, glycidol, styrene oxide, N-(2,3-epoxypropyl)phthalimide, 3-glycidyloxypropylene trimethylsilane or the like.

As poly-functional epoxides, there are exemplified as hydroquinone diglycidyl ether, resorcin diglycidyl ether, neopentyl diglycidyl ether, pentaerythritol polyglycidyl ether, orthophthalic acid diglycidyl ether, sorbitol tetraglycidyl ether, hexamethylendiol diglycidyl ether, polyglycerol triglycidyl ether, and the like. Since these polyfunctional epoxides can constitute a resin material by polymerizing themselves, they can fix the carbon dioxide and are preferred as the raw material composition for the resin foamed material.

As the nucleophilic reagent as the carbon dioxide fixation catalyst, a catalyst having halogen ions such as chloride ions, bromide ions or iodide ions is preferred, and it is preferred to be in an onium salt. Among the onium salts, an effective one is an ammonium salt represented by tetrabutylammonium bromide, tetrabutylammonium iodide or the like. It is also a preferred onium salt of a phosphonium salt represented by tetraphenyl phosphonium bromide, triphenylmethyl phosphonium bromide, and of a sulfonium salt represented by tributylsulfonium bromide. A complex compound of an amine compound with a halide can also be used. Another complex compound of an iodofluorohydrocarbon with a non-conjugated amine, ammonium salt, or a quaternary ammonium salt can also be used. It is also preferable to use a complex compound of a tertiary amine, an ammonium salt or a quaternary ammonium salt with the iodofluorohydrocarbon because it can produce a halogen ion easily.

As the electrophilic reagent as the carbon dioxide fixation catalyst, a zinc compound and a tin compound are used. As the zinc compound, it is preferable to use zinc chloride, zinc bromide, zinc iodide, zinc acetate, zinc stearate, zinc acetylacetonate, zinc citrate and the like. As the tin compound, it is preferable to use a tin halide such as tin chloride or the like, or an organotin compound such as tin dibutyldilaurate, tin dibutyldiacetate or the like. These compounds are useful for the present invention because they are substances that can also be used as the catalyst for the urethane reaction.

An alkali metal halide can also be used as the carbon dioxide fixation catalyst. Among these, a halide such as lithium bromide, lithium chloride, and any halide of sodium and potassium are preferred.

Ferric or ferrous chloride, copper chloride, cobalt chloride, manganese chloride, chromium chloride and the like are also a preferred carbon dioxide fixation catalyst.

In accordance with the present invention, the carbon dioxide fixation catalyst comprising the above-mentioned nucleophilic reagent and/or electrophilic reagent is mixed with the polyisocyanate together with the iodofluorohydrocarbon to obtain an polyisocyanate composition. The epoxide is mixed with the polyol. And, it is preferred to mix the polyisocyanate composition with the polyol composition, thereby to allow them to cause blowing reaction. By this procedure, it is possible to activate the carbon dioxide fixation reaction effectively.

That is, in order to sufficiently fix the carbon dioxide by the epoxide, it is useful to preserve the carbon dioxide fixation catalyst in a stable state until it is brought into contact with the carbon dioxide. By adding the carbon dioxide fixation catalyst to the isocyanate, and by mixing the iodofluorohydrocarbon with the polyisocyanate composition, it is possible to preserve the carbon dioxide fixation catalyst in a stable state. Since the carbon dioxide fixation catalyst is stabilized by an interaction with the iodofluorohydrocarbon in this state, it does not demonstrate any catalystic activity for carbon dioxide fixation in such a state. Only after the polyisocyanate composition is mixed with the polyol composition and the iodofluorohydrocarbon vaporizes by the heat generated by the resin reaction, the carbon dioxide fixation catalyst exerts its activity.

It is also preferred that if the iodofluorohydrocarbon and the carbon dioxide fixation catalyst are added previously as the complex compound, the epoxide reacts with the carbon dioxide more effectively. It is also a preferred configuration that the iodofluorohydrocarbon forms a complex compound with an amine and thus produces the liberated iodine ions which serve as the carbon dioxide fixation catalyst. In this case, too, it is preferable to previously separate the epoxide from the carbon dioxide fixation catalyst. Since the carbon dioxide fixation catalyst is stabilized by the complex formation, no unnecessary reaction takes place before the beginning of the urethane reaction and after the urethane reaction starts, the epoxide is allowed to react with the carbon dioxide effectively. It is also preferable for preventing the deterioration of the resin that after the carbon dioxide fixation reaction has been completed, the carbon dioxide fixation catalyst, which has been activated by the reaction heat, gradually returns to the state of complex compound with the iodofluorohydrocarbon, and loses its activity.

The role of the foam stabilizer employed in accordance with the present invention is to enhance the intermiscibility of the raw material and to stabilize the closed cells during the blowing process by serving as the cell cores, thereby to lower the surface tension of the resin material. As the foam stabilizer, a surfactant of silicones is particularly employed.

In the present invention, it is preferable to use a foam stabilizer comprising a dimethylsiloxane-oxyalkylene copolymer, and a dimethylsiloxane-oxyalkylene copolymer having a fluoroalkyl group in the molecules, in order to stabilize the closed cells, because the blowing agent is a compound containing a fluorine atom.

With the conventional silicone surfactant, it is difficult to stabilize the closed cells, and the cells are sometimes non-uniform and punctured during the blowing process if the blowing agent containing fluorine atom is used. The foam stabilizer having a fluoroalkyl group is easy to mix with the blowing agent of the present invention and still holds the foam stabilizing effect of the conventional foam stabilizer. As the silicone surfactant which can be used as the foam stabilizer in the present invention, there is a compound represented by the formula (4)

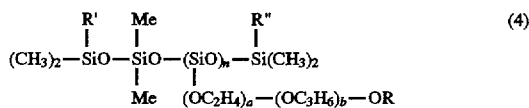

(wherein R, R' and R" are independently —H, —COCH$_3$, —(CF$_2$)$_x$CF$_3$, or —(CF$_2$)$_y$CF$_3$, and Me is a methyl group. a and b are each integers of from 1 to 10, and x and y are each integers of from 1 to 18.)

As the polyols which can be used in the present invention, polyether polyols and polyester polyols which have conventionally been used are suitable, except for the purpose of employing them with the iodofluorohydrocarbon as the blowing agent. In addition to these, polyols synthesized from polyhydric alcohols and having a plurality of hydroxyl groups in their molecules are suited for the purpose of obtaining a hardness of the resin, or controlling the reactivity. Catalyst-containing polyols containing a tertiary amine, a phosphor or a halogen together with the hydroxyl groups in their molecules, an incombustible polyol and an aromatic polyol are also suited.

To improve the blowing performance, addition of water to the polyol is preferable. In case of adding water together with the blowing agent having a relatively high boiling point in accordance with the present invention, it is possible to produce a foamed material having a low density, and to make the size of the closed cells uniform and smaller. Similarly, by adding alcohol to the polyol, it is ossible to improve the blowing performance of the blowing agent by the heat generated by the reaction of the alcohol with the isocyanate, and thus the addition of alcohol is preferable as in the case of adding water.

Suitable alcohols may be exemplified as methanol, ethanol, ethylene glycol, glycerine, pentaerythritol, α-methyl-D-glycoside, trimethylolpropane, sorbitol, sucrose and the like.

As the polyisocyanates suitably employed in the present invention, there may be exemplified as diphenylmethane diisocyanate, tolylene diisocyanate, xylylene diisocyanate, methaxylylene diisocyanate, hexamethylene diisocyanate, lysine diisocyanate, isophorone diisocyanate, trimethylhexamethylene diisocyanate, dimer acid diisocyanate and the like.

The catalyst for the urethane reaction employed in the present invention should be selected from a gelling catalyst, a foaming catalyst, a retarding catalyst or the like, which is most effective for the reactivity of the urethane raw material. The catalysts of general use are a tertiary amine and an organic metal compound. In the present invention, it is possible to use the amine catalysts of monoamines, diamines, triamines, cyclic amines, alcohol amines, ether amines and the like. An organotin compound is the most frequently employed organic metal compound. Since the boiling point of the blowing agent employed in the present invention is in a range from room temperature to 70° C., a catalyst of general prescription may be employed.

In case that the blowing agent has an extremely low or high azeotropic point, it is necessary to select the catalyst or to mix a variety of catalysts. It is also preferable for improving the bridged density to add water because it forms a urea bond by reaction with the isocyanate and contributes to the improvement in the physical property of the polyurethane.

As the agent for giving an incombustibility or a fire-retardant property employed in the present invention, there are a phosphate, a bromine-phosphor compound, an organic bromine compound and the like. In particular, a fire retardant of phosphor compounds such as tris(β-chloroethyl) phosphate, tricresyl phosphate, trixylenyl phosphate or the like is suited for the present invention because it produces a small amount of toxic gas during its combustion.

In addition, an additive such as a hydrolysis-preventing agent, an antioxidant or the like may yield an effect on the stabilization of the physical property of the produced foamed material for a long time.

Since the blowing agent in accordance with the present invention has a boiling point of about 40°–70° C., it is easy to obtain a foam having a suitable performance by mixing the blowing agent with the conventional polyol composition, and it is possible to obtain a foam having a lower thermal conductivity than that of the conventional cyclopentane-blown foam by 10–40%.

In the following paragraphs, the present invention will be described in more detail by referring to the concrete examples.

EXAMPLE 1

Polyurethane foams were prepared by using the raw material in accordance with the various prescriptions as listed in Table 1, and their thermal conductivies as well as other physical properties were measured and summarized in Table 1 below.

The raw material selectively included:

Polyol A: a polyether polyol of amines having a hydroxyl group value of 449 mgKOH/g.

Polyol B: a polyether polyol of sorbitols having a hydroxyl group value of 420 mgKOH/g.

Foam stabilizer A: a surfactant of silicones (trade name TY 19, available from Takeda Chemical Industries, Ltd., Japan).

Foam stabilizer B: a surfactant of fluorinated silicones (trade name X-70-090, available from Shin-Etsu Chemical Co., Ltd., Japan).

Catalyst A: a catalyst consisting mainly of N,N,N',N'-tetramethylhexamethylene diamine (trade name KAOLYZER No. 1, available from Kao Corporation, Japan).

Catalyst B: a composite catalyst of imidazoles (trade name KAOLYZER No. 300, available from Kao Corporation, Japan).

Blowing agent A: heptafluoro-2-iodopropane.

Blowing agent B: a mixture of heptafluoro-2-iodopropane and cyclopentane at a molar ratio of 1:2.

Blowing agent C: cyclopentane.

Isocyanate: a composition listed in Table 1 as MDI, containing polyisocyanate group by 31.4 wt % (trade name LUPRANATE M-20S, available from Takeda Chemical Industries, Ltd., Japan).

Additive A: propylene carbonate.

The foamed materials were prepared in the following manner.

First, premixtures were prepared by mixing each of the respective polyols, foam stabilizers, catalysts for the urethane reaction, water and blowing agents in each of Samples, except for Sample No. 1-5. Then, each of the prepared polyol premixture components was mixed with each of the polyisocyanate components at a predetermined combination ratio, while stirring with a high pressure blowing machine, and each of the obtained mixtures was filled in a space configured between an outer housing 1 and an inner housing 3, and allowed to blow itself to obtain a polyurethane foam 2. With regard to Sample No. 1-5, the blowing agent and the foam stabilizer were mixed with the polyisocyanate.

For comparison, an example of a foam (Sample No. 1-6) prepared using cyclopentane as the sole blowing agent was also listed in Table 1. Objects of the respective prescriptions will be illustrated as follows.

Sample No. 1-1: an example of a combined use of iodoflurohydrocarbon as the blowing agent and a water blowing.

Sample No. 1-2: a prescription aiming at improvement of the blowing performance by using a non-amine polyol and adding a carbonate compound.

Sample No. 1-3: a prescription aiming at incombustibility of the product by using a mixture of the iodofluorohydrocarbon and the cyclopentane as the blowing agent.

Sample No. 1-4: a prescription having the same composition as that of the comparative example of the cyclopentane blowing, except for the use of iodofluorohydrocarbon as the blowing agent.

Sample No. 1-5: a prescription of a use of non-amine polyol and the foam stabilizer.

Sample No. 1-6: a comparative example of an optimum combination wherein water is not added because addition of water decreases the thermal insulating property of the foam.

In contrast, in Sample Nos. 1-1, 1-2, 1-3 and 1-5 of the working example of the present invention, the amount of the polyisocyanate was increased from that of Sample No. 1-6 in consideration of the possible reaction of the polyisocyanate with water due to the addition of water. As regards the catalyst for the urethane reaction, in view of the effect by the addition of water, the catalyst B was used.

In each of the following Tables 1–5 in common, the amounts of the respective components are represented by part by weight. The units of various physical properties of the obtained foams are as follows.

Density of the foam: $kg/m^3$

Thermal conductivity: Ratio calculated assuming that the thermal conductivity of the cyclopentane-blown foam is 1.

Cell diameter: $\mu m$

Compression strength: kg weight/$cm^2$

TABLE 1

| Sample No. | | 1-1 | 1-2 | 1-3 | 1-4 | 1-5 | 1-6 |
|---|---|---|---|---|---|---|---|
| Polyol | A | 100 | 30 | 30 | 100 | 30 | 100 |
| | B | | 70 | 70 | | 70 | |
| Foam stabilizer | A | 3 | 3 | 3 | 3 | 2 | 3 |
| | B | | | | | 1 | |
| Catalyst | A | | | | 3 | | 3 |
| | B | 5 | 3 | 3 | | 3 | |
| Blowing agent | A | 72 | 72 | | 88 | 72 | |
| | B | | | 35 | | | |
| | C | | | | | | 21 |
| Additive | A | | 5 | | | | |
| MDI | | 137 | 137 | 137 | 125 | 137 | 125 |
| Water | | 1 | 1 | 1 | | 1 | |
| Foam density | | 39 | 36 | 34 | 45 | 34 | 35 |
| Thermal conductivity | | 0.80 | 0.63 | 0.65 | 0.92 | 0.60 | 1 |
| Cell diameter | | 410 | 300 | 280 | 500 | 160 | 360 |
| Compression strength | | 1.2 | 1.4 | 1.3 | 1.2 | 1.2 | 1.0 |
| Evaluation | | Fair | Optimum | Optimum | Acceptable | Optimum | Acceptable |

As clearly shown in Table 1, the foam of Sample No. 1-4 which used heptafluoro-2-iodopropane as its blowing agent demonstrated a lower thermal conductivity by about 10% than that of the foam of the comparative example which used cyclopentane as its blowing agent, with the same raw material prescription except for the blowing agent. The foam of Sample No. 1-4, however, had a high foam density and a large cell diameter. On the other hand, the foam of Sample No. 1-1 according to the prescription with the addition of water had a low thermal conductivity and improved physical properties in the density and shape of closed cells, for example.

In order to produce a foam having a lower thermal conductivity, when polyether polyol of sorbitols was substituted for 70% of the polyol as in Sample No. 1-2, the obtained foam demonstrated a further lower thermal conductivity. It was believed that such a reduction in the foam density was caused by the improvement in the blowing performance.

In addition, the cell diameter of the foam of Sample No. 1-2 was made uniform and smaller. It was believed that the obtained advantage was due to an influence of the propylene carbonate added as the additive. In this manner, it was possible to lower the thermal conductivity of the foam by about 30% or more than that of the foam of the comparative example which used cyclopentane as its blowing agent. The thermal insulating property of the obtained foam was greatly improved by the modification in the polyol and the additives.

The foam of Sample No. 1-3 which used a mixture with cyclopentane had a substantially equal performance to that of Sample No. 1-2 and a lower thermal conductivity than that of the foam of the comparative example which solely used cyclopentane as its blowing agent.

In order to evaluate the flammability of the foam, specimens of the foam cut in a shape of 1×1×5 cm were ignited. The foam of Sample No. 1-6 of the comparative example was completely burnt down, but the firing on the foam of Sample No. 1-3 of the working example was extinguished immediately after the ignition. The firing on the foam of Sample No. 1-2, which used heptafluoro-2-iodopropane as the blowing agent, was extinguished similarly. Thus, noncombustibility and self-extinguishing property of the foam by the iodofluorohydrocarbon mixed with the inflammable cyclopentane was demonstrated.

In order to modify the intermiscibility of the blowing agent with the other ingredient in the compositions, foams were prepared by varying the foam stabilizer. With the prescription of adding only a fluorocarbon-containing surfactant, the closed cells ruptured during the blowing process and the thermal conductivity of the foam was increased by the resultant enlargement of the closed cells. By adopting a prescription which is the same as that of Sample No. 1-1, except for the use of a mixture of the fluorocarbon-containing surfactant with the conventional silicone surfactant at a ratio of 1:2 by weight, the intermiscibility of the premixture was improved, the blowing performance was increased and the closed cells were stabilized. In this way, it was possible to obtain a foam with fine closed cells having a diameter of 270 microns. The thermal conductivity of this foam was 0.73.

In the foam of Sample No. 1-5, the above-mentioned mixed foam stabilizer was used and the polyisocyanate premixture was prepared by mixing it with the polyisocyanate. By mixing this polyisocyanate premixture with the polyol composition, the obtained mixture was allowed to blow. With this prescription, the thermal conductivity of the obtained foam was lowered by about 40% than that of the foam of the comparative example which used cyclopentane as its blowing agent, and it was possible to obtain a urethane foam having an optimum physical property for the thermal insulating material.

In addition, by adding this foam stabilizer in combination with the additive A, the thermal conductivity of the obtained foam was lowered to about 0.6, but the compression strength of the foam was slightly lowered to 0.95 kg/m$^3$.

In case of dispersing 5 parts by weight of magnetite powder in the polyisocyanate premixture in accordance with the prescription of Sample No. 1-5, the thermal conductivity of the obtained foam was 0.66 of that of the comparative example and there was no change in the thermal conductivity by the addition of magnetite. After a lapse of 3 months, the thermal conductivity of the same foam became 0.67. This showed only scarce deterioration in the thermal insulating property of the foam. In case of adding no magnetite, an oxygen absorbing agent, the thermal insulating property was considerably lowered as indicated by the thermal conductivity of 0.75. It was found that if the oxygen absorbing agent was added to the composition, the produced foam demonstrated a long-lasting favorable thermal insulating property.

EXAMPLE 2

Procedures similar to those in Example 1 were followed in producing the foams of Example 2 and evaluating their performances. Table 2 below summarizes the prescriptions of the raw materials as well as the performances of the obtained foams.

In addition to those described in Example 1, the raw material selectively included:

Blowing agent D: dimers of hexafluoropropene.

Blowing agent E: a mixture of heptafluoro-2-iodopropane and hexafluoropropene dimer at a molar ratio of 1:1.

Blowing agent F: a mixture of heptafluoro-2-iodopropane, dimers of hexafluoropropene and cyclopentane at a molar ratio of 1:1:2.

Objects of the respective prescriptions will be illustrated as follows.

Sample No. 2-1: a prescription of a combined or joint use of a perfluoroalkene as the blowing agent with a water blowing.

Sample No. 2-2: a prescription using a mixture of perfluoroalkene and iodofluorohydrocarbon as the blowing agent.

Sample No. 2-3: a prescription of a ternary (three components) blowing agent of a perfluoroalkene, an iodofluorohydrocarbon and cyclopentane.

Sample No. 2-4: a prescription having the same composition as the comparative example except for the use of perfluoroalkene as the blowing agent.

Sample No. 2-5: a prescription aiming at the effect of the use of mixed foam stabilizer plus water blowing in combination.

Sample No. 1-6: the comparative example of Example 1.

TABLE 2

| Sample No. | | 2-1 | 2-2 | 2-3 | 2-4 | 2-5 | 1-6 |
|---|---|---|---|---|---|---|---|
| Polyol | A | 100 | 100 | 100 | 100 | 100 | 100 |
| Foam stabilizer | A | 3 | 3 | 3 | 3 | 2 | 3 |
|  | B |  |  |  |  | 1 |  |
| Catalyst | A |  |  |  | 2 |  | 3 |
|  | B | 1 | 3 | 3 |  | 2 |  |
| Blowing agent | D | 40 |  |  | 90 | 56 |  |
|  | E |  | 72 |  |  |  |  |
|  | F |  |  | 47 |  |  |  |
|  | C |  |  |  |  |  | 21 |
| MDI |  | 172 | 137 | 137 | 125 | 154 | 125 |
| Water |  | 3 | 1 | 1 |  | 2 |  |
| Foam density |  | 40 | 35 | 38 | 50 | 36 | 35 |
| Thermal conductivity |  | 0.95 | 0.65 | 0.63 | 0.95 | 0.70 | 1 |
| Cell diameter |  | 200 | 220 | 230 | 300 | 110 | 360 |
| Compression strength |  | 1.2 | 1.0 | 1.0 | 1.0 | 1.1 | 1.0 |
| Evaluation |  | Fair | Optimum | Optimum | Acceptable | Fair | Acceptable |

In the foam of Sample No. 2-4, which used hexafluoropropene dimer as its blowing agent, the premixture was in a state of emulsion which is an unstable composition that separates the blowing agent within 3–4 hours, and the blowing density was high and the closed cells were non-uniform. In the foam of Sample No. 2-1, the amount of water to be added was 3 parts by weight and the amount of heptafluoropropene dimer was made small. According to this prescription, the blowing performance could be improved much. But carbon dioxide was contained in the gas confined in the closed cells by about 50%. For this reason, the thermal conductivity was made high, only slightly lower than that of the comparative example.

On the other hand, in the foam in accordance with the prescription of Sample No. 2-3, the value of the thermal conductivity was lower by about 37% than that of the comparative example which used cyclopentane as the blowing agent. The reason for this low value was that the heptafluoro-2-iodopropane and cyclopentane had an action of lowering the viscosity of the premixture emulsion to a certain degree, and that the emulsion served as the cell cores, thereby to make the closed cells uniform and smaller. The blowing agent for Sample No. 2-3 showed an azeotrope-like behavior and made its boiling point considerably low. As a result, a preferable blowing performance was obtained as in the case of using a low boiling point compound.

As a result of the evaluation on the combustibility of the foams, it was found that the foam of Sample Nos. 2-1, 2-2 and 2-4 had the same combustibility as in the case of mixed blowing agent of dimers of heptafluoropropene and carbon dioxide, although the inflammable cyclopentane was mixed in the composition. The incombustibility of the foam was far more than that of Sample No. 1-6 which used the cyclopentane.

In case of using a fluorinated silicone surfactant (the foam stabilizer B), the closed cells ruptured during the blowing reaction of the foam, which resulted in failure in forming a foam. In contrast to this, by the use of a foam conditioner, a mixture of fluorinated silicone surfactant and silicone surfactant (the foam stabilizer A), the stability of the premixture emulsion was improved and the emulsion was maintained without effecting any phase separation for 1 week or longer.

The obtained foam had fine closed cells and a thermal conductivity lower than that of the comparative example by about 30%. In Sample No. 2-5, hexafluoropropene dimer was solely used as the blowing agent, but it was possible to obtain a foam by a concurrent use of the mixed foam stabilizer and the reduction in the amount of water. In that case, it was possible to lower the thermal conductivity by further about 5% because the carbon dioxide was reduced accordingly.

When propylene carbonate was added to the prescription of Sample No. 2-4, the density of the obtained foam became about 41 kg/m$^3$; and its thermal conductivity was lowered by about 15%, which supported the effect of the additive.

By isolating isomers of heptafluoropropene dimer, each of them was used respectively in producing foams, which were then evaluated. As a result, the foams having substantially the same thermal insulating property were obtained.

EXAMPLE 3

Examples of using the hydrogen-containing fluoromorpholine derivatives as their blowing agents are shown. Procedures similar to those in Example 1 were followed in producing the foams and evaluating their performances. Table 3 below summarizes the prescriptions of the raw materials as well as the performances of the obtained foams.

In addition to those described previously, the raw material selectively included:

Blowing agent G: 3H-octafluoromorpholine.

Blowing agent H: 3H-heptafluoro-4-trifluoromethylmorpholine.

Blowing agent I: a mixture of 3H-heptafluoro-4-trifluoromethylmorpholine and cyclopenetane at a molar ratio of 1:1.

Blowing agent J: a mixture of 3H-heptafluoro-4-trifluoromethylmorpholine and isopentane at a molar ratio of 1:1.

Additive B: neopentyl diglycidyl ether.

Foam stabilizer C: a mixture of foam stabilizer A and B at a weight ratio of 3:1.

Objects of the respective prescriptions will be illustrated as follows.

Sample Nos. 3-1 and 3-2: two prescriptions of a combined use of the hydrogen-containing fluoromorpholine derivative as the blowing agent with a water blowing, each having a different fluoromorpholine derivative.

Sample No. 3-2: a prescription using a mixture of the hydrogen-containing fluoromorpholine derivative with the iodofluorohydrocarbon as the blowing agent.

Sample No. 3-3: a prescription using a mixture of the hydrogen-containing fluoromorpholine derivative with cyclopentane as the blowing agent.

Sample No. 3-4: a prescription using a mixture of the hydrogen-containing fluoromorpholine derivative with isopentane as the blowing agent.

Sample No. 3-5: a prescription of mixing an epoxide as the additive and blowing without water.

Sample No. 1-6: the comparative example of Example 1.

A foam was prepared in accordance with the prescription of Sample No. 3-5, aiming at a foam having a lower thermal conductivity, by adding an epoxide and solely using the hydrogen-containing morpholine derivative as the blowing agent. A premixture was prepared by using 3H-octafluoromorpholine as the blowing agent and adding 5 parts by weight of neopentyl diglycidyl ether as the additive.

TABLE 3

| Sample No. | | 3-1 | 3-2 | 3-3 | 3-4 | 3-5 | 1-6 |
|---|---|---|---|---|---|---|---|
| Polyol | A | 100 | 100 | 100 | 100 | 95 | 100 |
| Foam stabilizer | A | 3 | 3 | 3 | | | 3 |
| | C | | | | | 3 | |
| Catalyst | A | | | | | 3 | 3 |
| | B | 3 | 3 | 3 | 3 | | |
| Blowing agent | G | 69 | | | | 69 | |
| | H | | 72 | | | | |
| | I | | | 43 | | | |
| | J | | | | 45 | | |
| | C | | | | | | 21 |
| Additive | B | | | | | 5 | |
| MDI | | 137 | 137 | 137 | 137 | 144 | 125 |
| Water | | 1 | 1 | 1 | 1 | | |
| Foam density | | 43 | 41 | 35 | 33 | 36 | 35 |
| Thermal conductivity | | 0.83 | 0.68 | 0.72 | 0.76 | 0.62 | 1 |
| Cell diameter | | 300 | 350 | 240 | 190 | 100 | 360 |
| Compression strength | | 1.2 | 1.3 | 1.1 | 1.0 | 1.2 | 1.0 |
| Evaluation | | Fair | Optimum | Fair | Fair | Optimum | Acceptable |

The foam in accordance with the prescription of Sample No. 3-1 produced by using 3H-octafluoromorpholine as its sole blowing agent in combination with the water blowing, and another foam in accordance with the prescription of Sample No. 3-2 except for the use of 3H-heptafluoro-4-trifluoromethylmorpholine in place of the 3H-octafluoromorpholine had a lower thermal conductivity than that of a foam produced without addition of water. The foam density was however relatively high and the cell diameter was large. The intermiscibility of the polyol with the blowing agent was relatively favorable, and a premixture emulsion having a low viscosity was obtained as in the case of the comparative example (Sample No. 1-6). The thermal conductivity of the foam was lowered by 10% or more than the comparative example but the foam density was high. It is therefore necessary to modify the foam in order to improve the thermal insulating property.

Since the blowing agent H has a slightly high boiling point and thus its blowing performance is poor, the density of the obtained foam becomes high. When the blowing processes were performed in accordance with the prescriptions of Sample Nos. 3-3 and 3-4 wherein cyclopentane and isopentane having a low boiling point are respectively mixed with the blowing agent H, the densities of the obtained foams were lowered by the improvement in the blowing performance, whereby the thermal conductivities were lowered accordingly.

In compliance with the prescription of Sample No. 3-3, the foam having a low thermal conductivity was obtained. The value was lower by about 30% than that of the comparative example. Since the thermal conductivity of the blowing agent, cyclopentane, is higher than that of the morpholine derivative, the thermal conductivity of the obtained foam is increased due to the influence of the blowing agent, cyclopentane, having a high thermal conductivity. In order to obviate this deficiency, heptafluoro-1-iodopropane was substituted for cyclopentane in the prescription of Sample No. 3-3, and as a result, the thermal conductivity of the obtained foam became very low and was lower by 30% or more than that of the comparative example.

When the premixture was mixed with the polyisocyanate, a period for foaming was shortened in comparison with the case of adding no epoxide, and the blowing performance was made favorable in comparison with other prescriptions. The obtained foam had a low density, and the cell diameter was made smaller and uniform, thereby to give a urethane foam having a very good performance.

EXAMPLE 4

Examples prepared to confirm the effects of the additives in addition to the effects of the respective blowing agents are shown. Procedures similar to those in Example 1 were followed in producing the foams and evaluating their performances. Table 4 below summarizes the prescriptions of the raw materials as well as the performances of the obtained foams.

In addition to those described previously, the raw material selectively included:

Blowing agent K: a complex compound (liquid state) of heptafluoro-2-iodopropane with tetrabutylammonium bromide.

Additive C: potassium carbonate.

Additive C': ethylene glycol. (wherein the additive C is used concurrently with the additive C' as a solution thereof.)

Additive D: sodium thiosulfate.

Additive D': water for dissolving the additive D.

The respective prescriptions in the table will be illustrated as follows.

Sample No. 4-1: a prescription of using a mixture of an iodofluorohydrocarbon and a perfluoroalkene as the blowing agent.

Sample No. 4-2: a prescription for miniaturizing the closed cells by adding potassium carbonate dissolved in ethylene glycol.

Sample No. 4-3: a prescription of adding sodium thiosulfate as a reducing agent in an aqueous solution. This aqueous solution of sodium thiosulfate is mixed with the isocyanate in the step of preparing the raw material.

Sample No. 4-4: a prescription aiming at a utilization of the complex compound of the iodofluorohydrocarbon with the amine compound, wherein the amount of the perfluoroalkene to be added as the liquid blowing agent is 1 mole for a mole of the iodofluorohydrocarbon which forms the complex compound. Water is also added as a reaction controlling agent.

Sample No. 4-5: a prescription of adding water to the mixed blowing agent for comparative purpose.

Sample No. 1-6: the comparative example of Example 1.

blowing agent containing heptafluoro-2-iodopropane, a considerable rise in the thermal conductivity was observed. It was believed that a decomposition of heptafluoro-2-iodopropane participated in the rise in the thermal conductivity.

On the other hand, no change in the thermal conductivity was observed in Sample No. 4-3. This may be because the added sodium thiosulfate contributed to suppressing the possible decomposition of heptafluoro-2-iodopropane. When the compression strength of the foam was measured

TABLE 4

| Sample No. | | 4-1 | 4-2 | 4-3 | 4-4 | 4-5 | 1-6 |
|---|---|---|---|---|---|---|---|
| Polyol | A | 70 | 70 | 70 | 100 | 70 | 100 |
| | B | 30 | 30 | 30 | | 30 | |
| Foam stabilizer | A | 3 | 3 | 2 | 3 | 2 | 3 |
| | B | | | 1 | | 1 | |
| Catalyst | A | 3 | 3 | 3 | 2 | | 3 |
| | B | | | | 1 | 3 | |
| Blowing agent | E | 89 | 89 | 73 | | 73 | |
| | D | | | | 40 | | |
| | K | | | | 60 | | |
| | C | | | | | | 21 |
| Additive | C | | 5 | | | | |
| | C' | | 5 | | | | |
| | D | | | 0.5 | | | |
| | D' | | | 1 | | | |
| MDI | | 125 | 125 | 138 | 130 | 138 | 125 |
| Water | | | | | 0.5 | 1 | |
| Foam density | | 43 | 45 | 35 | 35 | 38 | 35 |
| Thermal conductivity | | 0.80 | 0.74 | 0.70 | 0.65 | 0.67 | 1 |
| Thermal conductivity (after one month) | | 0.90 | 0.80 | 0.70 | 0.67 | 0.77 | 1.1 |
| Cell diameter | | 300 | 170 | 130 | 200 | 150 | 360 |
| Compression strength | | 1.0 | 1.0 | 1.0 | 1.0 | 1.2 | 1.0 |
| Evaluation | | Fair | Fair | Optimum | Optimum | Fair | Acceptable |

In the samples using the respective blowing agents, thermal insulating foamed materials having a lower thermal conductivity than that of the comparative example by 20% or more were obtained. The foam in accordance with the prescription of Sample No. 4-5 added with water had a smaller cell diameter, and thus had a lower density and a lower thermal conductivity in comparison with those of Sample No. 4-1. It was also confirmed that the physical property such as strength in addition to the thermal conductivity of the obtained foam was improved by adding different blowing agents, similar to those of Examples 1, 2 and 3.

The cell diameter of the foam produced in accordance with the prescription of Sample No. 4-2 was made very small. This may be because the salt dissolved in ethylene glycol acted as the cell cores. When the aqueous solution of sodium thiosulfate was added to the isocyanate, the cell diameter of the obtained cell was made further smaller.

Sample No. 4-4 has a prescription such that the complex compound of the amine compound with the iodofluorohydrocarbon is added, the heptafluoro-2-iodopropane in the complex compound is regarded as the blowing agent, the total amount of the blowing agent is equal to that of Sample No. 4-1, and a small amount of water is added. In this manner, a hard polyurethane foam having a favorable foam density and a low thermal conductivity was obtained.

As a result of an investigation on the change by aging of the thermal conductivity of the foam by standing it in a place exposed to day light, no change was observed in the comparative example after a lapse of one month. In the urethane foams produced in accordance with the prescriptions of Sample Nos. 4-1, 4-2 and 4-5, which used the mixed after one month, a considerable decrease in the strength was observed in every foam except for that of Sample No. 4-3.

In the prescription of Sample No. 4-4, the complex compound of heptafluoro-2-iodopropane and tetrabutylammonium bromide was added. The total amount of heptafluoro-2-iodopropane for the amount of hexafluoropropene dimer was made 1:1 at a molar ratio similar to Sample No. 4-1. As a result, it was possible to improve the blowing performance even by the use of the same conventional polyol raw material, and to obtain a foam having relatively small closed cells.

EXAMPLE 5

Examples of adding an epoxide to the composition are shown. Procedures similar to those in Example 1 were followed in producing foams and evaluating their performances. Table 5 below summarizes the prescriptions of the raw materials as well as the performances of the obtained foams.

In addition to those described previously, the raw material selectively included:

Blowing agent L: a complex compound of heptafluoro-2-iodopropane with tetramethylhexamethylene diamine, wherein the total amount of the blowing agent in the complex compound plus the blowing agent to be added solely is equal to that in both of Sample Nos. 5-2 and 5-3.

Catalyst C: tin dibutyldilaurate.

Additive E: phenylglycidyl ether.

Additive F: tetrabutylammonium bromide which acts as the carbon dioxide fixation catalyst.

The respective prescriptions in the table will be illustrated as follows.

Sample No. 5-1: a normal prescription of using an iodofluorohydrocarbon as the blowing agent.

Sample No. 5-2: a prescription of adding an epoxide to the blowing agent of the iodofluorohydrocarbon and having an object of absorbing and fixing the carbon dioxide generated by the reaction of water with the isocyanate.

Sample No. 5-3: a prescription similar to that of Sample No. 5-2, wherein a polyol premixture obtained by mixing an epoxide which dissolves the carbon dioxide fixation catalyst is mixed with the blowing agent (iodofluorohydrocarbon) and then the obtained premixture is mixed with the isocyanate for performing the blowing process.

Sample No. 5-4: a prescription, wherein a complex compound formed by mixing the iodofluorohydrocarbon with the carbon dioxide fixation catalyst is added to the polyisocyanate, to ensure a high yield of the carbon dioxide fixation.

Sample No. 5-5: a prescription, wherein cyclopentane is used as the blowing agent and the carbon dioxide is fixed by adding an epoxide.

Sample No. 1-6: the comparative example of Example 1.

Substantially the same result was obtained with that of Sample No. 5-3. When the foams of Sample Nos. 5-2 and 5-3 were analyzed using an infrared spectrometer, it was found that the epoxide which had been incorporated in the composition was allowed to react with the carbon dioxide and thus converted into the carbonate compound by about 100%, and it was believed that the carbon dioxide was fixed in a high yield.

The foam of Sample No. 5-4 was obtained by adding the complex compound of heptafluoro-2-iodopropane with tetramethylhexamethylene diamine. In this case, the rate in the carbon dioxide fixation reaction was rapid, and a gas analysis confirmed that 90% or more of the carbon dioxide was fixed one day after the manufacturing. Based on the fact that the density of the foam was lowered, it was believed that the above-mentioned complex compound served as the catalyst for the urethane reaction. It was also believed that the complex compound produced a liberated iodine which has an effect of the fixation catalyst.

The thermal conductivities of the foams produced in accordance with the prescriptions of Sample Nos. 5-3 and 5-4 were decreasing with a lapse of time even one month after the manufacturing.

FIG. 1 is a view of a housing for a refrigerator as an example of the application of the thermal insulating foamed

TABLE 5

| Sample No. | | 5-1 | 5-2 | 5-3 | 5-4 | 5-5 | 1-6 |
|---|---|---|---|---|---|---|---|
| Polyol | A | 70 | 70 | 100 | 100 | 100 | 100 |
| | B | 30 | 30 | | | | |
| Foam stabilizer | A | 3 | 3 | 3 | 3 | 3 | 3 |
| Catalyst | A | 3 | | | | | 3 |
| | C | | 0.2 | 0.2 | 0.2 | 0.2 | |
| Blowing agent | A | 89 | 73 | 73 | 65 | | |
| | L | | | | 13 | | |
| | C | | | | | 21 | 21 |
| Additive | E | | 27 | 27 | 27 | 27 | |
| | F | | 5 | 5 | | 5 | |
| MDI | | 125 | 138 | 138 | 138 | 138 | 138 |
| Water | | | 1 | 1 | 1 | 1 | 1 |
| Foam density | | 43 | 45 | 42 | 35 | 38 | 35 |
| Thermal conductivity | | 0.80 | 0.78 | 0.67 | 0.65 | 0.88 | 1 |
| Thermal conductivity (after one month) | | 0.81 | 0.65 | 0.65 | 0.60 | 0.80 | 1 |
| Evaluation | | Fair | Fair | Optimum | Optimum | Fair | Acceptble |

The prescription of Sample No. 5-5 follows that of the comparative example with the addition of 1 part by weight of water. By addition of the additives E and F, the carbon dioxide confined in the closed cells of the foamed resin was able to be absorbed, thereby to lower the thermal conductivity by 10% or higher than that of the comparative example. The thermal conductivity was further lowered to about 20% after a lapse of 7 days. When the carbon dioxide confined in the closed cells of the foam was analyzed using gas chromatography, it was found that substantially the whole of the carbon dioxide generated at the initial stage of the blowing process was lost.

The foam produced in accordance with the prescription of Sample No. 5-2 which used a mixture of heptafluoro-2-iodopropane plus water as the blowing agent with the addition of the additives E and F had a lower thermal conductivity than that of the comparative example, similar to that of Sample No. 5-1, because the thermal conductivity of the blowing agent was low. Further, the thermal conductivity of the foam of Sample No. 5-2 was lowered by 33% than that of the comparative example after a lapse of one week.

material in accordance with the present invention. It is constituted by combining an outer housing 1 made of a metal with an inner housing 3 made of a hard resin. The resin for inner housing 3 is preferably a thermoplastic resin in view of its moldability. It is desirable that the thermoplastic resin will not be deteriorated by the insulating material of polyurethane foam, and ABS resin and the like are suitable.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A thermal insulating foamed material comprising a foamed resin composition which has a multiplicity of closed cells, wherein said closed cells confine a gas of a blowing agent of at least one compound selected from the group consisting of iodofluorohydrocarbons, and hydrogen-containing fluoromorpholine derivatives.

2. The thermal insulating foamed material in accordance with claim 1, wherein said blowing agent is a mixture of iodofluorohydrocarbon with either of a perfluoroalkene or an alkene having a perfluoroalkyl group; or the hydrogen-containing fluoromorpholine derivative.

3. The thermal insulating foamed material in accordance with claim 1, wherein said foamed resin composition contains a reducing agent.

4. The thermal insulating foamed material in accordance with claim 1, wherein said foamed resin composition contains an oxygen absorbing agent.

5. The thermal insulating foamed material in accordance with claim 1, wherein said foamed resin composition contains a carbon dioxide fixation catalyst, a carbonate compound as a product of reaction of an epoxide with carbon dioxide.

6. A thermal insulating foamed material comprising a foamed resin composition which has a multiplicity of closed cells, wherein said foamed resin composition contains a complex compound of the iodofluorohydrocarbon with an amine, an ammonium salt or a quaternary ammonium salt having a non-conjugated bond.

7. The thermal insulating foamed material in accordance with claim 1 wherein said iodofluorohydrocarbon has four or less carbon atoms and a boiling point of 65° C. or lower.

8. The thermal insulating foamed material in accordance with claim 6, wherein said iodofluorohydrocarbon has four or less carbon atoms and a boiling point of 65° C. or lower.

9. The thermal insulating foamed material in accordance with claim 7, wherein said iodofluorohydrocarbon is one member selected from the group consisting of iodotrifluoromethane, iodopentafluoroethane, 1-iodoheptafluoropropane, 2-iodoheptafluoropropane, iodo-1,1,2,2-tetrafluoroethane, 2-iodo-1,1,1-trifluoroethane, iodotrifluoroethylene, 1-iodo-1,1,2,3,3,3-hexafluoropropane and 2-iodononafluoro-t-butane.

10. The thermal insulating foamed material in accordance with claim 8, wherein said iodofluorohydrocarbon is one member selected from the group consisting of iodotrifluoromethane, iodopentafluoroethane, 1-iodoheptafluoropropane, 2-iodoheptafluoropropane, iodo-1,1,2,2-tetrafluoroethane, 2-iodo-1,1,1-trifluoroethane, iodotrifluoroethylene, 1-iodo-1,1,2,3,3,3-hexafluoropropane and 2-iodononafluoro-t-butane.

11. The thermal insulating foamed material in accordance with claim 2, wherein said blowing agent is a mixture of iodofluorohydrocarbon with one member selected from the group consisting of perfluoro-2-pentene, (perfluorobutyl)ethylene, (perfluoropropyl)ethylene, octafluorocyclopentene, and dimers of hexafluoropropene.

12. The thermal insulating foamed material in accordance with claim 1, wherein said hydrogen-containing fluoromorpholine derivative is one member selected from the group consisting of monohydroperfluoromorpholines and monohydroperfluoromethylmorpholines.

13. The thermal insulating foamed material in accordance with claim 1, wherein said closed cells further confine at least one of hydrocarbon selected from the group consisting of pentane, isopentane and cyclopentane.

14. The thermal insulating foamed material in accordance with claim 6, wherein said closed cells further confine at least one of hydrocarbon selected from the group consisting of pentane, isopentane and cyclopentane.

* * * * *